United States Patent
Heo et al.

(10) Patent No.: US 10,612,996 B2
(45) Date of Patent: Apr. 7, 2020

(54) STRUCTURAL STATE EVALUATION SYSTEM FOR SMART STRUCTURE USING MULTI-SENSING

(71) Applicant: Industry Foundation of Konyang University, Nonsan-si (KR)

(72) Inventors: Gwang Hee Heo, Daejeon (KR); Joon Ryong Jeon, Daejeon (KR)

(73) Assignee: Industry Foundation of Konyang University, Chuncheongnam-do (KR)

(*) Notice: Subject to any disclaimer, the term of this patent is extended or adjusted under 35 U.S.C. 154(b) by 252 days.

(21) Appl. No.: 14/631,126

(22) Filed: Feb. 25, 2015

(65) Prior Publication Data

US 2015/0241300 A1 Aug. 27, 2015

(30) Foreign Application Priority Data

Feb. 25, 2014 (KR) .................. 10-2014-0021906

(51) Int. Cl.
*G01M 7/00* (2006.01)
*G01M 5/00* (2006.01)

(52) U.S. Cl.
CPC ............ *G01M 7/00* (2013.01); *G01M 5/0066* (2013.01)

(58) Field of Classification Search
CPC ................................ G01M 7/00; G01B 11/03
See application file for complete search history.

(56) References Cited

U.S. PATENT DOCUMENTS

| 5,065,552 A | * | 11/1991 | Kobori | E04H 9/02 52/1 |
| 2007/0114422 A1 | * | 5/2007 | Berkcan | B64D 43/00 250/358.1 |
| 2009/0132199 A1 | * | 5/2009 | Parker | G01B 11/03 702/150 |

FOREIGN PATENT DOCUMENTS

| EP | 2650664 A1 | 10/2013 |
| KR | 100587821 B1 | 2/2006 |

OTHER PUBLICATIONS

G. Heo, M. L. Wang & D. Satpathi, Optimal transducer placement for health monitoring of long span bridge, Nov. 4, 1996; revised Apr. 3, 1997; accepted Apr. 9, 1997, p. 496-502.*
Chin-Hsiung Loh1, Jerome P. Lynch2, Kung-Chun Lu1, Yang Wang3, Chia-Ming Chang1, Pei-Yang Lin4, Ting-Hei Yeh1, Experimental Verification of a Wireless Sensing and Control System for Structural Control Using MR-Dampers, Mar. 6, 2007, Earthquake Engineering & Structural Dynamics, vol. 36, Is. 10.*

* cited by examiner

*Primary Examiner* — Matthew G Marini
(74) *Attorney, Agent, or Firm* — The Webb Law Firm

(57) ABSTRACT

Provided is a structural state evaluation system for a smart structure using multi-sensing capable of coping with and controlling vibrations in real time by reasonably and efficiently determining positions of sensors included in a constructional structure using an optimal position determining algorithm and defining a baseline structure using a finite element (FE) model improving algorithm to measure and acquire various information on the smart structure through multi-sensing and evaluate and analyze structural safety.

5 Claims, 3 Drawing Sheets

STRUCTURAL STATE EVALUATION SYSTEM FOR SMART STRUCTURE USING MULTI-SENSING

CROSS-REFERENCE TO RELATED APPLICATION

This application claims priority to Korean Patent Application No. 10-2014-0021906 filed Feb. 25, 2014, the disclosure of which is hereby incorporated in its entirety by reference.

TECHNICAL FIELD

The following disclosure relates to a structural state evaluation system for a smart structure using multi-sensing. More particularly, the following disclosure relates to a structural state evaluation system for a smart structure using multi-sensing capable of coping with and controlling vibrations in real time by reasonably and efficiently determining positions of sensors included in a constructional structure using an optimal position determining algorithm and defining a baseline structure using a finite element (FE) model improving algorithm to measure and acquire various information on the smart structure through multi-sensing and evaluate and analyze structural safety.

BACKGROUND

Generally, a constructional structure is exposed to various harmful environments (conditions) after being constructed, such that it may be gradually deteriorated and a structural defect may occur in the constructional structure by a specific event, which may cause a serious structural problem such as a decrease in a life expectancy designed at the beginning, unexpected damage (destruction), or the like.

In other words, as a time elapses, the deterioration of the constructional structure occurs, and a load non-specifically occurring depending on a time due to wind, an earthquake, a vehicle, and the like, is applied to the constructional structure, and behavior of the constructional structure is also changed depending on a time and a load acting on the constructional structure. In addition, the constructional structure has been complicated and multi-functionalized due to the development of a material and a construction technology and a change in a design method, or the like, a scale of the constructional structure has also become large.

However, when a state of the structure is constantly maintained, a natural frequency, a damping coefficient, a mode shape, and the like, of a target structure appearing by dynamic behavior characteristics of the structure are constantly maintained, and this structure is called an integrity structure.

The deterioration or other damage allows a change to appear in an element such as mass, rigidity, or the like, in which characteristics of the structure are reflected, and this change causes a change in a dynamic characteristic value of the integrity structure.

Therefore, an effort to continuously monitor, diagnose, maintain, and manage dynamic characteristics of the structure such as health of the structure in the medium and long view is very important. To this end, structural identification (SI) should precede at a reference point in time. Recently, a smart structure technology in which the structure itself recognizes/judges a structural state thereof and has appropriate coping capability has been demanded.

To this end, a role of a structural health monitoring (SHM) system has become important. In this regard, many studies for implementing the SHM system have been conducted. The monitoring technology as described above is a technology capable of maximizing and improving stability of a structure such as a building, a bridge, or the like, by measuring, analyzing, and diagnosing a dynamic behavior situation of the structure.

The monitoring technology as described above mainly includes a process of acquiring data from a sensor attached to the structure and a process of converting the data to analyze data for evaluating damage of the structure.

However, in designing an effective structural health monitoring (SHM) system, very many technologies are required. Particularly, a structure damage identification method and data acquiring and transmitting technologies are the most important and basic.

This system generates artificial input vibrations for vibrating the structure in the structure, and performs only health monitoring based on a condition due to many problems, or the like, caused by the artificial input vibrations.

Therefore, a measuring and controlling system capable of being operated in the case of a separate emergency in addition to the structure, collecting various structure information through multi-sensing, and perform real time measurement and coping in order to evaluate structural safety of a constructional structure with respect to non-specific external force and have crisis response capability if necessary has been urgently demanded.

Here, when a plurality of sensor positions (measuring points) provided in the structure may be selectively decreased so as to be appropriate for an object mode, both of efficiency and economic efficiency may be improved. Particularly, in health monitoring requiring real time/long term measurement, processing of measured data is very numerical value-intensive and a large number of repetition calculations are required. Therefore, it is very important to maximize quality of monitored information and minimize the number of measuring instruments.

Therefore, a structural state evaluation system for a smart structure using multi-sensing of the present invention relates to a structural state evaluation system for a smart structure using multi-sensing capable of coping with and controlling vibrations in real time by reasonably and efficiently determining positions of sensors included in a constructional structure using an optimal position determining algorithm and defining a baseline structure using a finite element (FE) model improving algorithm to measure and acquire various information on the smart structure through multi-sensing and evaluate and analyze structural safety.

Korean Patent No. 10-0587821 entitled "Automatic Measuring and Control System for Safety of Structure" has disclosed an automatic measuring and control system having a function capable of continuously measuring a safety state of a bridge or a tunnel that requires safety and needs to be continuously monitored, allowing a personal management agent such as a construction inspect company or a safety diagnosis company and a public management agent such as a government, a local government, or the like, to perform monitoring, if necessary, and controlling a measuring equipment installed in a structure positioned at a long distance from the safety diagnosis company and used to secure safety of the structure.

Europe Patent Application No. 2012-168249 entitled "A method for monitoring a structure based on measurements of a plurality of sensors" has disclosed a monitoring method for identifying a development defect of a structure using collected values measured by a plurality of sensors installed in a structure such as a building, a bridge, or the like.

RELATED ART DOCUMENT

Patent Document

Korean Patent No. 10-0587821 registered on Jun. 1, 2006
Europe Patent Application Publication No. 2012-168249 published on Oct. 16, 2013

SUMMARY

An embodiment of the present invention is directed to providing a structural state evaluation system for a smart structure using multi-sensing capable of coping with and controlling vibrations in real time by reasonably and efficiently determining positions of sensors included in a constructional structure using an optimal position determining algorithm and defining a baseline structure using a finite element (FE) model improving algorithm to measure and acquire various information on the smart structure through multi-sensing and evaluate and analyze structural safety.

In one general aspect, a structural state evaluation system for a smart structure using multi-sensing that evaluates a structural state of the smart structure in real time through an optimal sensor position determining algorithm and a finite element (FE) model improving algorithm, includes: a measuring unit 100 deriving a numerical value model of the smart structure by a minimal number of calculations through the FE model improving algorithm; and a multi-sensing unit 200 connected to the measuring unit 100 through a wireless network and including a plurality of sensors 210 positioned at optimal measuring positions determined by the measuring unit 100 and detecting signals for evaluating the structural state from the smart structure, wherein the optimal measuring positions of the plurality of sensors 210 for detecting the signals for evaluating the structural state from the smart structure are determined through the optimal sensor position determining algorithm, and the measuring unit 100 receives measured values by the plurality of sensors 210 of the multi-sensing unit 200 in real time and diagnoses and evaluates the structural state of the smart structure.

The multi-sensing 200 unit includes: an analog to digital converter (ADC) 220 converting analog signals detected by the plurality of sensors 210 into digital signals; and a wireless transmitting and receiving device 230 transmitting the digital signals and receiving a vibration control signal from the measuring unit 100.

The structural state evaluation system for a smart structure using multi-sensing may further include a controlling unit 300 including a damper and receiving a vibration control signal from the measuring unit 100 depending on the measured values by the plurality of sensors 210 of the multi-sensing unit 200 to control an operation of the damper in real time, wherein the measuring unit 100 diagnoses the structural state of the smart structure depending on the measured values by the plurality of sensors 210 of the multi-sensing unit 200 and generates and transfers the vibration control signal corresponding to the diagnosed structural state, through a preset vibration control algorithm.

The structural state evaluation system for a smart structure using multi-sensing may further include a controlling unit 300 including a plurality of dampers and receiving a vibration control signal from the multi-sensing unit 200 depending on the measured values by the plurality of sensors 210 of the multi-sensing unit 200 to control operations of the plurality of damper in real time, wherein the multi-sensing unit 200 generates and transfers the vibration control signal corresponding to the structural state of the smart structure diagnosed and evaluated by the measuring unit 100 through a preset vibration control algorithm.

The structural state evaluation system for a smart structure using multi-sensing may further include a power supply unit supplying power 400, wherein a main power supply of the power supply unit 400 is at least any one of a solar battery, a wind energy source, and a wave energy source, and an auxiliary power thereof is a lithium (Li) ion battery.

The structural state evaluation system for a smart structure using multi-sensing may further include a storing unit storing and managing information on the optimal measuring positions of the sensors 210 determined by the measuring unit 100, information on the numerical value model of the smart structure derived by the measuring unit 100, information on the signals measured by the multi-sensing unit 200, and information on the structural state of the smart structure by the measuring unit 100.

[Detailed Description of Main Elements]

Figure 1:
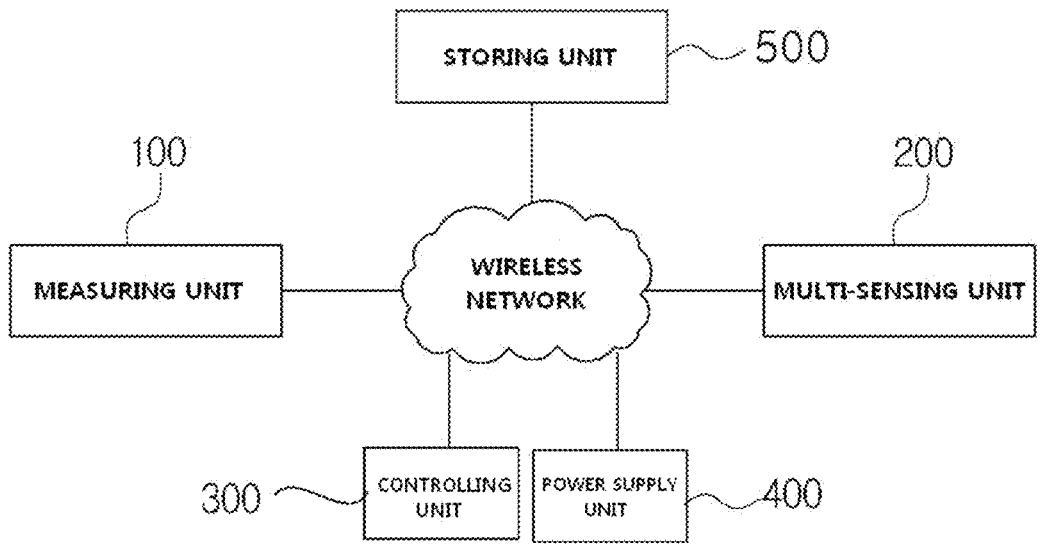
FIG. 1 is a configuration diagram schematically showing a structural state evaluation system for a smart structure using multi-sensing according to an exemplary embodiment of the present invention.

| | | | |
|---|---|---|---|
| 100: | Measuring unit | | |
| 200: | Multi-sensing unit | | |
| 210: | Measuring Sensor | 220: | ADC |
| 230: | Wireless transmitting and receiving device | | |
| 300: | Controlling unit | | |
| 400: | Power supply unit | | |
| 500: | Storing unit | | |

DETAILED DESCRIPTION OF EMBODIMENTS

Hereinafter, a structural state evaluation system for a smart structure using multi-sensing according to an exemplary embodiment of the present invention will be described in detail with reference to the accompanying drawings. The drawings to be provided below are provided by way of example so that the idea of the present invention can be sufficiently transferred to those skilled in the art to which the present invention pertains. Therefore, the present invention is not be limited to the drawings provided below but may be modified in many different forms. In addition, like reference numerals denote like elements throughout the specification.

Technical terms and scientific terms used in the present specification have the general meaning understood by those skilled in the art to which the present invention pertains unless otherwise defined, and a description for the known function and configuration obscuring the present invention will be omitted in the following description and the accompanying drawings.

In addition, a system means a set of components including a device, a mechanism, a means, and the like, organized and regularly interacting in order to perform required functions.

A constructional structure has been complicated and multi-functionalized due to the development of a material and a construction technology and a change in a design method, or the like, a scale of the constructional structure has also become large. Recently, a smart structure technology in which the structure itself recognizes/judges a structural state thereof and has appropriate coping capability has been demanded.

As a result, in order to evaluate structural safety of the constructional structure with respect to non-specific external force and have crisis response capability if necessary, a separate measuring and controlling system in addition to the constructional structure are required.

Therefore, a structural state evaluation system for a smart structure using multi-sensing of the present invention is a structural state evaluation system capable of coping with and controlling vibrations in real time by reasonably and efficiently determining positions of sensors included in a constructional structure using an optimal position determining algorithm and defining a baseline structure using a finite element (FE) model improving algorithm to measure and acquire various information on the smart structure through multi-sensing and evaluate and analyze structural safety.

Although a cable-stayed bridge having flexible structural behavior characteristics has been described by way of example in an exemplary embodiment of the present invention, it is only an example of the present invention. That is, the present invention may be applied to all of various structures including a smart structure.

Since the cable-stayed bridge having the flexible structural behavior characteristics is vulnerable to generation of vibrations while being publicly used, systematic and continuous health monitoring needs to be performed after the cable-stayed bridge is constructed. To this end, a baseline structure may be first defined in a satisfactory level through a detailed FE analysis and modal experiment, and a modal characteristic value corresponding to an actual structure may be extracted from the baseline structure and be used as an evaluation reference for health monitoring.

Here, when an optimal structure response may be acquired from a minimal number of measuring points (or degrees of freedom) and an FE model numerically representing the structure response for the minimal number of measuring points may be derived, health monitoring having high efficiency and economic efficiency is possible.

Therefore, the structural state evaluation system for a smart structure using multi-sensing according to an exemplary embodiment of the present invention may perform structural identification (SI) of the cable-stayed bridge through the optimal sensor position determination and the FE model improvement.

In detail, in the optimal sensor position determination, kinetic energy optimization techniques (EOT) has been used in consideration of structural behavior characteristics having a low and narrow natural frequency band due to flexibility of the cable-stayed bridge, and in the FE model improvement, a direct matrix updating method (DMUM) has been used in order to minimize the number of calculations for deriving a numerical model.

Through this, in the structural state evaluation system for a smart structure using multi-sensing according to an exemplary embodiment of the present invention, the optimal sensor positions may be decreased to a value within about 20% as compared with all measuring points for an object mode, and the FE model improvement has an accuracy less than 1% as compared with dynamic characteristics (natural frequency error rate and mode correlation) of an actual structure.

Figure 2:
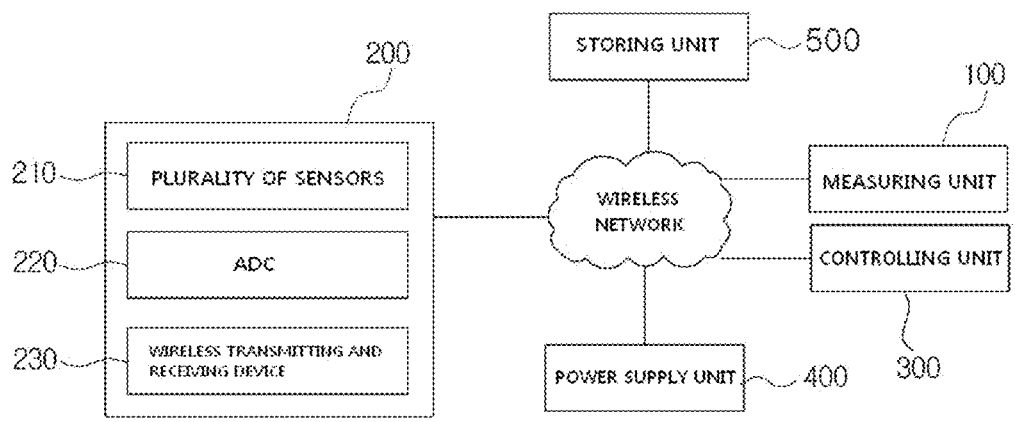
FIG. 2 is a configuration diagram showing the structural state evaluation system for a smart structure using multi-sensing according to an exemplary embodiment of the present invention in detail.

The structural state evaluation system for a smart structure using multi-sensing according to an exemplary embodiment of the present invention may be configured to include a measuring unit 100, a multi-sensing unit 200, a controlling unit 300, a power supply unit 400, and a storing unit 500, as shown in FIGS. 1 and 2, and evaluates a structural state of the smart structure in real time through an optimal sensor position determining algorithm and an FE model improving algorithm.

The measuring unit 100, the multi-sensing unit 200, the controlling unit 300, the power supply unit 400, and the storing unit 500 may be interconnected by a wireless network.

The respective components will be described below in detail.

The measuring unit 100 may determine optimal measuring positions of a plurality of sensors 210 provided in the multi-sensing unit 200 and detecting signals for evaluating the structural state of the smart structure and may derive a numerical value model of the smart structure by a minimal number of calculations.

Here, the signals detected by the plurality of sensors 210 include signals for a temperature, a humidity, a displacement, a load (stress), a deformation rate, a gradient, a speed, an acceleration, neutralization, a crack, and the like, and the plurality of sensors 210 may be a plurality of heterogeneous sensors and may be flexibly changed, extended, and applied by a manager.

That is, the measuring unit 100 may determine the optimal measuring positions of the plurality of sensors 210 of the multi-sensing unit 200 through a preset (pre-stored) optimal sensor position determining algorithm.

Here, a kinetic energy optimization technique (EOT) of determining an optimal measuring position using deformation kinetic energy of a structure is used as the optimal sensor position determining algorithm.

Dynamic modal information on a maximum value of the measured deformation kinetic energy is acquired from the smart structure. In this case, an optimal measuring system may be configured by sequentially removing points at which minimum energy is shown from a unique system in which linear independency of an acquired mode type is present.

Distribution of kinetic energy of a general constructional structure may be defined as represented by the following Equation 1.

$$KE = \Phi^T M \Phi \quad \text{[Equation 1]}$$

Here, KE indicates kinetic energy, $\Phi$ indicates a measured mode type vector, and M indicates a mass matrix.

Here, the mass matrix M may be decomposed into an upper triangular matrix L and a lower triangular matrix U, which may be represented by $\Psi = U\Phi$ and $M = LU$, respectively, and a mode type projection depending on a decreased measuring factor may be defined by the following Equation 2.

$$\bar{\Phi} = Pr\,ojection(\Phi)$$

$$\bar{\Psi} = Pr\,ojection(\Psi) \quad \text{[Equation 2]}$$

Through this, the minimized number and positions of measuring instruments, that is, sensors, capable of maximizing measurement of the kinetic energy of the smart structure are determined.

However, in the case in which an energy matrix causes rank poorness, the sensor is not removed any more, and when the mass matrix is a non-singular matrix, a row rank N of $\overline{KE}$ element is the same the number of linearly independent projected vectors in a $\Phi$ matrix.

Therefore, when considering an eigen value $\Lambda$ and an eigen vector $\Psi$ of the energy matrix itself, since $\overline{KE}$ is a rectangular symmetrical positive definite matrix having a magnitude of N, calculation of an eigen-pair calculated in each calculating procedure in the kinetic energy optimization technique is not affected.

Contribution degrees of each remaining sensor may be represented by an EOT vector as represented by the following Equation 3.

$$EOT = \sum_{j=1...m} \left[ \Psi_\Psi \Lambda^{-\frac{1}{2}} \right]^2 \qquad \text{[Equation 3]}$$

Since the measured mode type of the EOT vector is linearly independent, the EOT needs to be an orthogonal vector as represented by the following Equation 4.

$$\left[ \Psi_\Psi \Lambda^{-\frac{1}{2}} \right]^T \left[ \Psi_\Psi \Lambda^{-\frac{1}{2}} \right] = I \qquad \text{[Equation 4]}$$

The measuring unit 100 according to an exemplary embodiment of the present invention derives a numerical value model of the smart structure in a minimum number of calculations through the FE model improving algorithm. Here, a direct matrix updating method (DMUM) capable of minimizing the number of calculations for deriving the numerical value model may be used as the FE model improving algorithm.

When a modified structure is added to or removed from an initial structure configured in advance, dynamic characteristics of an entire structure after being modified are changed. Here, dynamic characteristics before and after structural modification may be represented as an eigen value problem as represented by the following Equation 5.

$$([K] - \Lambda[M])\{\Phi\} = 0$$

$$(([K]+[\Delta K]) - \overline{\Lambda}([M]+[\Delta M]))\{\overline{\Phi}\} = 0 \qquad \text{[Equation 5]}$$

Here, [K] indicates a stiffness matrix, [M] indicates a mass matrix, [$\Delta K$] and [$\Delta M$] indicates stiffness and mass change matrices of the structure due to modification, $\Lambda, \{\Phi\}$ indicate an eigen value and an eigen vector before a structure is damaged, respectively, and $\overline{\Lambda}, \{\overline{\Phi}\}$ indicate an eigen value and an eigen vector after modification, respectively.

The measuring unit 100 according to an exemplary embodiment of the present invention has used the direct matrix updating method (DMUM) capable of being more easily used and accomplishing an excellent model improving effect in consideration of requirements of repeated calculations, or the like, at the time of calculating an FE model improvement effect and a modal change amount among methods of calculating changes in stiffness [$\Delta K$] and mass [$\Delta M$] due to the modification of the structure.

Here, an object function configured so as to satisfy a measured eigen value while limiting a magnitude of change amounts of the stiffness and mass matrices using the Lagrange multiplier is represented by the following Equation 6.

Here, the direct matrix updating method (DMUM) is used, thereby making it possible to calculate change amounts for the respective terms of the stiffness and the mass by one once matrix calculation (Direct).

$$\varepsilon_K = \left\| [K_A]^{-\frac{1}{2}}([K_U]-[K_A])[K_A]^{-\frac{1}{2}} \right\| \qquad \text{[Equation 6]}$$

$$\varepsilon_M = \left\| [M_A]^{-\frac{1}{2}}([M_U]-[M_A])[M_A]^{-\frac{1}{2}} \right\|$$

Here, [$K_A$] and [$M_A$] indicates stiffness and mass matrices of the structure before being modified, respectively, and [$K_U$] and [$M_U$] indicates stiffness and mass matrices of the structure after being modified, respectively.

According to this Equation, a relationship between [$K_A$] and [$K_U$] is represented by the following Equation 7, and a relationship between [$M_A$] and [$M_U$] is represented by the following Equation 8.

$$[K_U]=[K_A]+[\Delta K] \qquad \text{[Equation 7]}$$

$$[M_U]=[M_A]+[\Delta M] \qquad \text{[Equation 8]}$$

Here, [$\Delta K$] in the above Equation 7 is defined as represented by the following Equation 10 using the following Equation 9.

$$[K_U]-[K_U]^T=0$$

$$[\Phi_X]^T[K_U][\Phi_X]-[\Lambda_X]=0 \qquad \text{[Equation 9]}$$

$$[\Delta K]=-[K_A][\Phi_X][\Phi_X]^T[M_A]-[M_A][\Phi_X][\Phi_X]^T[K_A]+ \\ [M_A][\Phi_X][\Phi_X]^T[K_A][\Phi_X][\Phi_X]^T[M_A]+[M_A][\Phi_X] \\ [\Lambda_X][\Phi_X]^T[M_A] \qquad \text{[Equation 10]}$$

In addition, [$\Delta M$] in the above Equation 8 is defined as represented by the following Equation 12 using the following Equation 11.

$$[M_U]-[M_U]^T=0$$

$$[\Phi_X]^T[M_U][\Phi_X]-[I]=0 \qquad \text{[Equation 11]}$$

$$[\Delta M]=[M_A][\Phi_X]([\Phi_X]^T[M_X][\Phi_X])+([I]-[\Phi_X]^T[M_A] \\ [\Phi_X])([\Phi_X]^T[M_A][\Phi_X])+[\Phi_X]^T[M_A] \qquad \text{[Equation 12]}$$

Since a target of FE model improvement in the measuring unit 100 of the structural state evaluation system for a smart structure using multi-sensing according to an exemplary embodiment of the present invention is a result of FE analysis and modal experiment, a subscript A means a result value by analysis, and a subscript X means an experiment value.

That is, the measuring unit 100 of the structural state evaluation system for a smart structure using multi-sensing according to an exemplary embodiment of the present invention determines the optimal measuring positions of the plurality of sensors 210 of the multi-sensing unit 200 measuring various physical amounts of the smart structure by using the kinetic energy optimization technique (EOT), which is the optimal sensor position determining algorithm and derives the numerical value model of the smart structure by the minimal number of calculations by using the direct matrix updating method (DMUM), which is the FE model improving algorithm.

The multi-sensing unit 200 may be connected to the measuring unit 100 through the wireless network and may include the plurality of sensors 210 positioned at the optimal measuring positions determined by the measuring unit 100.

The plurality of sensors 210 detect signals for evaluating a structural state from the smart structure and transfers the detected signals to the measuring unit 100.

Therefore, the measuring unit 100 may receive various measured values from the plurality of sensors 210 and diagnose and evaluate the structural state of the smart structure.

Here, the multi-sensing unit 200 may further include an analog to digital converter (ADC) 220 and a wireless transmitting and receiving device 230, wherein the ADC 220 may convert analog signals detected by the plurality of sensors 210 into digital signals and the wireless transmitting and receiving device 230 may transmit the digital signals converted by the ADC 220 to the measuring unit 100 and receive a vibration control signal from the measuring unit 100.

Here, the vibration control signal may be a signal for controlling an operation of a damper included in the controlling unit 300, and vibrations of the smart structure may be controlled by receiving control force of the damper.

Figure 3:
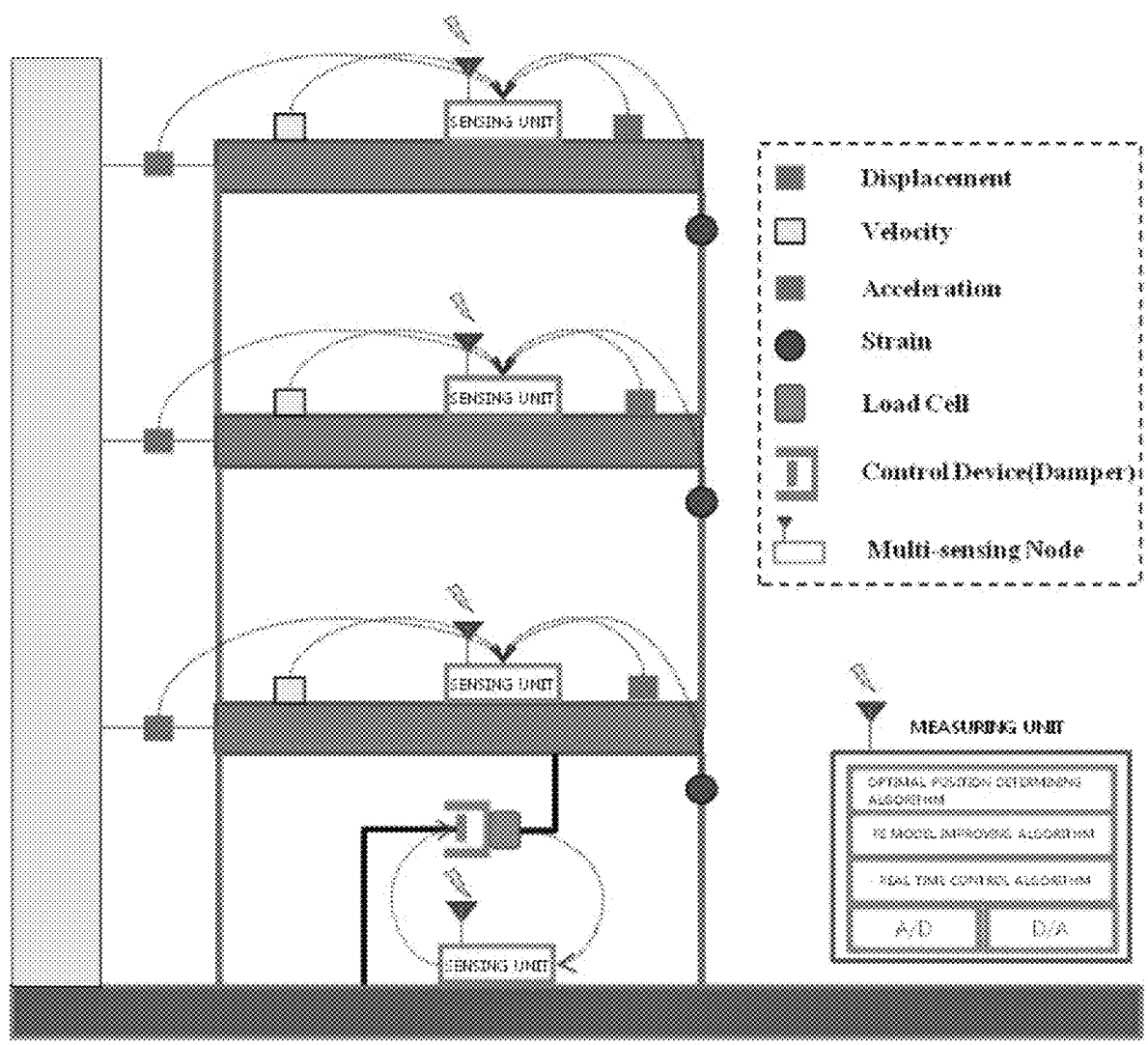
FIG. 3 is a diagram schematically showing a central controlling configuration of the structural state evaluation system for a smart structure using multi-sensing according to an exemplary embodiment of the present invention.
Figure 4:
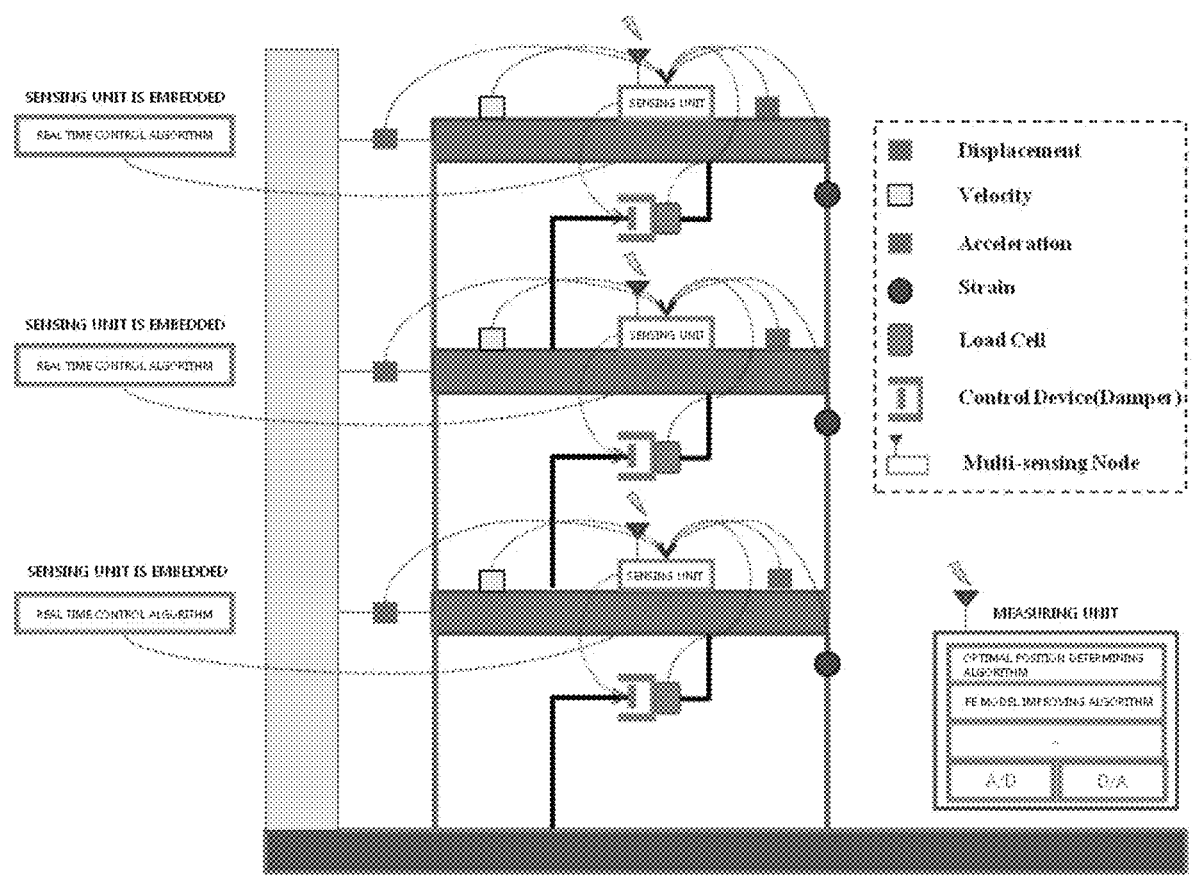
FIG. 4 is a diagram schematically showing a distributed controlling configuration of the structural state evaluation system for a smart structure using multi-sensing according to an exemplary embodiment of the present invention.

FIG. 3 is a diagram showing a central controlling configuration of the controlling unit 300 in the structural state evaluation system for a smart structure using multi-sensing according to an exemplary embodiment of the present invention; and FIG. 4 is a diagram showing a distributed controlling configuration of the controlling unit 300.

The controlling unit 300 may include the damper and may receive the vibration control signal from the measuring unit 100 or the multi-sensing unit 200. In the case in which the controlling unit 300 receives the vibration control signal from the measuring unit 100, it perform a central control, and in the case in which the controlling unit 300 receives the vibration control signal from the multi-sensing unit 200, it performs a distributed control.

In the case of the central control as shown in FIG. 3, the controlling unit 300 receives the vibration control signal from the measuring unit 100 and controls an operation of the damper in real time.

Here, the measuring unit 100 diagnoses the structural state of the smart structure using measured values received from the plurality of sensors 210 of the multi-sensing unit 200 and generates the vibration control signal corresponding to the diagnosed structural state, through a preset vibration control algorithm.

The measuring unit 100 transfers the generated vibration control signal to the multi-sensing unit 200 and the controlling unit 300, and a control output is confirmed through the vibration control signal transferred to the multi-sensing unit 200, such that the operation of the damper is actually controlled depending on the vibration control signal transferred to the controlling unit 300.

In addition, in the case of the distributed control as shown in FIG. 4, the controlling unit 300 receives the vibration control signal from the multi-sensing unit 200 and controls an operation of the damper in real time.

Here, the multi-sensing unit 200 generates the vibration control signal corresponding to the structural state of the smart structure diagnosed and evaluated by the measuring unit 100 using the preset vibration control algorithm.

In the case in which the vibration control signal is generated by the multi-sensing unit 200, a plurality of dampers may be provided in the controlling unit 300, as shown in FIG. 4, and operations of the dampers are controlled per the vibration control signal generated by the plurality of sensors 210 of the multi-sensing unit 200.

In this case, the vibration control algorithm is not set in the measuring unit 100, such that a real time structure response by diagnosis and evaluation of the structural state of the smart structure depending on the measured value transferred from the multi-sensing unit 200 and vibration control monitoring depending on the vibration control signal are possible.

The structural state evaluation system for a smart structure using multi-sensing according to an exemplary embodiment of the present invention may further include the power supply unit 400 and the storing unit 500. The power supply unit 400 and the storing unit 500 are also connected to the measuring unit 100 through the wireless network, similar to the multi-sensing unit 200.

A main power supply of the power supply unit 400 is at least any one of a solar battery, a wind energy source, and a wave energy source, and an auxiliary power thereof is a lithium (Li) ion battery. These power supplies may allow the multi-sensing unit 200 to perform continuous measurement and transmit a measurement result to the measuring unit 100.

The storing unit 500 means a separate storing means and may store and manage information on the optimal measuring positions of the plurality of sensors 210 of the multi-sensing unit 200 determined by the measuring unit 100, information on the numerical value model of the smart structure derived by the measuring unit 100, information on the signals measured by the plurality of sensors 210 of the multi-sensing unit 200, and information on the structural state of the smart structure by the measuring unit 100.

That is, in the structural state evaluation system for a smart structure using multi-sensing according to an exemplary embodiment of the present invention, the measuring unit 100 determines the optimal number and positions of the plurality of sensors 210 of the multi-sensing unit 200. Therefore, the measuring unit 100 evaluates the information on the structural state of the smart structure using various information of the smart structure transferred from the plurality of sensors 210 positioned at the optimal positions.

Through this, the measuring unit 100 uses the kinetic energy optimization techniques (EOT) as the optimal sensor position determining algorithm to compare contribution degrees of entire modified kinetic energy with each other for each degree of freedom based on an interest mode and sequentially remove degrees of freedom having a relatively low contribution degree, thereby making it possible to efficiently perform determination of the number and positions of sensors capable of optimally measuring an object reference response among a plurality of measuring points (degrees of freedom).

The cable-stayed bridge having the flexible structural behavior characteristics will be described by way of example. When considering a total of three low level warpage mode, an effective structural response of the model cable-stayed bridge is sufficiently acquired only by about seven sensors of which positions are determined (about 20% based on an entire degree of freedom) among a total of 39 measuring points.

In addition, the measuring unit 100 uses the direct matrix updating method (DMUM) as the FE model improving algorithm, thereby making it possible to overcome an initial FE modeling error and effectively define a baseline structure in which dynamic characteristics of the structure in a current point in time (reference point in time) are reflected. Particularly, it may be appreciated that since correction values of the stiffness and the mass may be determined by only one calculation, temporal and economical effects are more excellent as compared with a repetition method according to the related art.

In addition, the controlling unit 300 may perform a real time vibration control regardless of a scale of the structure through the central or distributed damper operation control.

Therefore, in the case of using the structural state evaluation system for a smart structure using multi-sensing according to an exemplary embodiment of the present invention in performing health monitoring, diagnosis, and maintenance of a large structure that is structurally complicated, has a plurality of measuring points (degrees of freedom) corresponding to the complication, and has a natural frequency in a relatively low and narrow interval, the evaluation of the structural state of the baseline structure required for the structural identification (SI) may be economically and efficiently performed.

With the structural state evaluation system for a smart structure using multi-sensing according to an exemplary embodiment of the present invention, the kinetic energy optimization techniques (EOT), which is the optimal sensor position determining algorithm, is used to compare contribution degrees of entire modified kinetic energy with each other for each degree of freedom based on an interest mode and sequentially remove degrees of freedom having a relatively low contribution degree, thereby making it possible to efficiently perform determination of the number and positions of a plurality of heterogeneous sensors capable of optimally measuring an object reference response among a plurality of measuring points (degrees of freedom). Therefore, a sufficiently effective structure response may be acquired only by sensors of about 20% based on an entire degree of freedom.

In addition, the direct matrix updating method (DMUM), which is the FE model improving algorithm, is used to reflect a structure response measured in the smart structure and configure an FE model corresponding to the structure response, making it possible to overcome an initial FE modeling error and effectively define a baseline structure in which dynamic characteristics of the smart structure in a current point in time (reference point in time) are reflected.

In addition, in the direct matrix updating method (DMUM), since correction values of the stiffness and the mass may be determined by only one calculation, temporal and economical effects are more excellent as compared with a repetition method according to the related art such as an error matrix updating method (EMUM), or the like.

Through this, the plurality of sensors provided in the smart structure may collect various information of the smart structure at reasonable, efficient, and optimal positions and use these information to configure a baseline structure, thereby making it possible to easily evaluate structural safety of the smart structure and rapidly perform an operation in the case of an emergency and perform real time measurement, analysis, and coping.

Hereinabove, although the present invention is described by specific matters such as concrete components, and the like, exemplary embodiments, and drawings, they are provided only for assisting in the entire understanding of the present invention. Therefore, the present invention is not limited to exemplary embodiments. Various modifications and changes may be made by those skilled in the art to which the present invention pertains from this description.

Therefore, the spirit of the present invention is not interpreted to be limited to exemplary embodiments described in the present specification, and the following claims as well as all modified equally or equivalently to the claims is to fall within the scope and spirit of the invention.

What is claimed is:

1. A structural state evaluation system for a smart structure using multi-sensing that evaluates a structural state of the smart structure in real time through an optimal sensor position determining algorithm and a finite element (FE) model improving algorithm, comprising:
    a plurality of multi-sensing units (200) comprising a plurality of sensors (210) for detecting signals for evaluating the structural state of the smart structure;
    a measuring unit (100) connected to the plurality of multi-sensing units (200) through a wireless network; and
    a plurality of control units (300) connected to each of the multi-sensing units (200) through the wireless network, each including at least one damper and controlling operation of the damper,
    wherein the measuring unit (100) is configured to:
    (A) determine an optimal number and positions of the plurality of sensors by measuring kinetic energy of the smart structure according to a kinetic energy optimization technique (EOT) which is the optimal sensor position determining algorithm, and
    (B) after the plurality of sensors of the multi-sensing unit are positioned at the optimal positions determined in step (A), diagnose and evaluate the structural state of the smart structure by:
    (i) calculating, prior to a structural change of the smart structure, values of stiffness and mass matrices preset by values of the signals detected by the plurality of sensors (210), and
    (ii) following step (B)(i):
        (a) determining, after the structural change of the smart structure, changes in the values of the signals detected by the plurality of sensors (210),
        (b) updating, via a direct matrix updating method (DMUM), the stiffness and mass matrices with the changes in the values of the signals determined in step (B)(ii)(a), and
        (c) determining, based on the stiffness and mass matrices updated in step (B)(ii)(b) change amounts in the values of the stiffness and mass matrices, and
    wherein each of the multi-sensing units (200) is configured to generate a vibration control signal corresponding to the structural state of the smart structure diagnosed and evaluated by the measuring unit (100) in step (B) through a preset vibration control algorithm and transfer the vibration control signal to each of the control units (300), and
    each of the control units (300) receives the vibration control signal from each of the multi-sensing units (200) to control the operation of the damper in real time, thereby controlling vibrations of the smart structure.

2. The structural state evaluation system for a smart structure using multi-sensing of claim 1, wherein each multi-sensing unit includes:
    an analog to digital converter (ADC) converting analog signals detected by the plurality of sensors into digital signals; and
    a wireless transmitting and receiving device transmitting the digital signals and receiving a vibration control signal from the measuring unit.

3. The structural state evaluation system for a smart structure using multi-sensing of claim 1, further comprising a power supply unit supplying power, wherein a main power supply of the power supply unit is at least any one of a solar battery, a wind energy source, and a wave energy source, and an auxiliary power thereof is a lithium (Li) ion battery.

4. The structural state evaluation system for a smart structure using multi-sensing of claim 1, further comprising a storing unit storing and managing at least any one of information on measured signals, information on the optimal measuring positions of the sensors, information on the numerical value model of the smart structure, and information on the structural state of the smart structure.

5. A method for evaluating a structural state of a smart structure comprising:
 (A) determining, by a measuring unit (100) connected to a plurality of multi-sensing units (200) through a wireless network, an optimal number and positions of a plurality of sensors (210) of each of the plurality of multi-sensing units (200) by determining kinetic energy of the smart structure according to a kinetic energy optimization technique (EOT) which is an optimal sensor position determining algorithm;
 (B) positioning the plurality of sensors (210) of each of the plurality of multi-sensing units (200) at the optimal positions determined by the measuring unit (100) in step (A);
 (C) receiving, by the measuring unit (100), signals related to the structural state of the smart structure from the plurality of sensors (210) of each of the plurality of multi-sensing unit (200);
 (D) diagnosing and evaluating, by the measuring unit (100), the structural state of the smart structure prior to and after a structural change of the smart structure by:
 (i) calculating, prior to the structural change of the smart structure, values of stiffness and mass matrices preset by values of the signals related to the structural state of the smart structure received by the measuring unit (100) in step (C), and
 (ii) following step (D)(i):
  (a) determining, after the structural change of the smart structure, changes in the values of the signals related to the structural state of the smart structure received by the measuring unit (100) in step (C),
  (b) updating, via a direct matrix updating method (DMUM), the stiffness and mass matrices with the changes in the values of the signals related to the structural state of the smart structure determined in step (D)(ii)(a), and
  (c) determining, based on the stiffness and mass matrices updated in step (D)(ii)(b) change amounts in the values of the stiffness and mass matrices;
 (E) generating, by each of the plurality of multi-sensing units (200), a vibration control signal corresponding to the structural state of the smart structure diagnosed and evaluated by the measuring unit (100) in step (D) through a preset vibration control algorithm;
 (F) transferring the vibration control signal to each of a plurality of control units (300), each of the plurality of control units (300) including at least one damper and controlling operation of the damper, each of the multi-sensing units (200) is connected to each of the control units (300) through the wireless network; and
 (G) receiving, by each of the control units (300), the vibration control signal from each of the multi-sensing units (200) to control operation of the damper in real time, thereby controlling vibrations of the smart structure.

* * * * *